United States Patent
Mukkamala et al.

(10) Patent No.: US 7,467,389 B2
(45) Date of Patent: Dec. 16, 2008

(54) SYSTEM AND METHODOLOGY PROVIDING SERVICE INVOCATION FOR OCCASIONALLY CONNECTED COMPUTING DEVICES

(75) Inventors: Himagiri Mukkamala, Pleasanton, CA (US); Michael Ho, Danville, CA (US)

(73) Assignee: Sybase, Inc., Dublin, CA (US)

( * ) Notice: Subject to any disclaimer, the term of this patent is extended or adjusted under 35 U.S.C. 154(b) by 381 days.

(21) Appl. No.: 10/904,702

(22) Filed: Nov. 23, 2004

(65) Prior Publication Data

US 2006/0112398 A1    May 25, 2006

(51) Int. Cl.
*G06F 9/44* (2006.01)
(52) U.S. Cl. .................. 719/316; 719/330; 709/219
(58) Field of Classification Search ........... 719/313, 719/319, 310, 320, 328, 330, 316; 717/174; 709/203, 217, 218, 219
See application file for complete search history.

(56) References Cited

U.S. PATENT DOCUMENTS

| | | | | |
|---|---|---|---|---|
| 6,073,163 A | | 6/2000 | Clark et al. ............. 709/203 |
| 6,089,454 A | | 7/2000 | Sadler .................... 235/383 |
| 6,425,017 B1 | * | 7/2002 | Dievendorff et al. .... 719/315 |
| 6,449,657 B2 | | 9/2002 | Stanbach, Jr. et al. ... 709/245 |
| 6,477,565 B1 | | 11/2002 | Daswani et al. ........ 709/217 |
| 6,584,548 B1 | | 6/2003 | Bourne et al. ........... 711/134 |
| 6,792,046 B2 | * | 9/2004 | Hatano et al. ......... 375/240.24 |
| 6,820,116 B1 | | 11/2004 | Pyhalammi et al. ..... 709/219 |
| 6,920,480 B2 | * | 7/2005 | Mitchell et al. ........ 709/203 |
| 6,944,662 B2 | | 9/2005 | Devine et al. .......... 709/225 |
| 6,952,772 B2 | | 10/2005 | Deo et al. .............. 713/170 |
| 6,954,751 B2 | | 10/2005 | Christfort et al. ......... 707/6 |
| 6,959,436 B2 | | 10/2005 | Peng .................... 719/310 |
| 6,968,181 B2 | | 11/2005 | Ishidoshiro ........... 455/414.2 |
| 2002/0065946 A1 | * | 5/2002 | Narayan ............... 709/315 |
| 2003/0069922 A1 | * | 4/2003 | Arunachalam ......... 709/203 |
| 2005/0160434 A1 | * | 7/2005 | Tan et al. .............. 719/331 |
| 2006/0047742 A1 | * | 3/2006 | O'Neill et al. ......... 709/203 |

OTHER PUBLICATIONS

Abdelsalam et Al. "Replication Techniques in Distributed Systems." Boston, MA: Kluwer Academic Publishers, 2002 (p. 73-94).*
Sun Microsystems, Java 2 Platform Enterprise Edition Specification, v. 1.4, Final Release. Sun Microsystems, Inc., Mountain View, CA, Nov. 24, 2003.

(Continued)

*Primary Examiner*—Van H Nguyen
(74) *Attorney, Agent, or Firm*—John A. Smart; G. Mack Riddle

(57) ABSTRACT

A system and methodology providing service invocation for occasionally connected computing devices is described. In one embodiment, for example, in an occasionally connected computing environment, a system of the present invention for providing deferred invocation of services for a mobile device is described that comprises: an application running on a mobile device; a device-side object providing mobile support for a particular service from a server, the device-side object intercepting any requests from the application for invocation of the particular service, thereby deferring actual invocation of the particular service at that time; and a server-side object residing on the server that passes the requests on to a service provider for actual invocation while the mobile device is connected, and returns any result from the actual invocation back to the mobile device for use by the application.

22 Claims, 13 Drawing Sheets

OTHER PUBLICATIONS

W3C, SOAP Version 1.2 Part 1: Messaging Framework, W3C.org, Jun. 2003.
W3C, SOAP Version 1.2 Part 2: Adjuncts, W3C.org, Jun. 2003.
Sun Microsystems, Inc., Jobs 5.0 Specification (Ch. 1-5), Final Release, Sun Microsystems, Inc., Mountain View, CA, Oct. 2001.
W3C, Web Services Description Language (WSDL) 1.1, W3C, Mar. 15, 2001.
Gosling, J. et al., The Java Language Environment: A White Paper, Sun Microsystems Computer Company, Oct. 1995.
W3C, Extensible Markup Language (XML) 1.0 specification, W3C.org, Oct. 6, 2000.
Fielding et al., RFC2616: Hypertext Transfer Protocol—HTTP/1.1, Network Working Group, Jun. 1999.
R. Srinivasan, RFC1831: RFC: Remote Procedure Call Protocol Specification Version 2, Sun Microsystems, Aug. 1995.
Socolofsky, T. et al., RCF1180: A TCP/IP Tutorial, Spider Systems Limited, Jan. 1991.

* cited by examiner

WSDL Extensions for Prefetch

```
<soapcache:binding isQueued="false"
isCached="false"/>
<wsdlsoap:binding style="rpc"
transport="http://schemas.xmlsoap.org/
soap/http"/>
<wsdl:operation name="getDrugNews">
<soapcache:operation isCached="true">
<soapcache:cacheParams>
<soapcache:cacheParam>
<soapcache:partId>id</soapcache:partId>
<soapcache:preFetchValues>
<soapcache:partValue>SY</
soapcache:partValue>
<soapcache:partValue>Lodine</
soapcache:partValue>
</soapcache:preFetchValues>
</soapcache:cacheParam>
</soapcache:cacheParams>
</soapcache:operation>
```

*FIG. 5*

SYSTEM AND METHODOLOGY PROVIDING SERVICE INVOCATION FOR OCCASIONALLY CONNECTED COMPUTING DEVICES

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Appendix Data

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 34937 Bytes, created: Nov. 15, 2004 3:07:32 PM; Object ID: File No. 1; Object Contents: Source code.

BACKGROUND OF INVENTION

1. Field of the Invention

The present invention relates generally to data processing environments and, more particularly, to invocation of services by occasionally connected (e.g., mobile) computing devices.

2. Description of the Background Art

Mobile applications have started to proliferate and are adding significant business value to enterprises by providing access to information regardless of the location of the user. Users enriched by these applications include an enterprise's customers, partners, and employees, thereby benefiting the entire value chain. Significant advances in mobile device characteristics have added to the momentum. As these applications get more complicated, there continue to be major challenges like battery life, screen size, CPU cycles, network connectivity, and so forth. Although there have been advances in most of these areas, these criteria have to be considered when designing applications for usage on mobile devices like laptops, PDAs, Smartphones, Tablets, and the like.

Users of these applications expect a uniform experience whether the device is connected or not. They want an application to function similarly in a connected environment and a disconnected environment. They expect applications to adapt to the battery life and perform optimizations to allow them to access applications for longer intervals. New initiatives like WiMAX (802.16.) and 3G based WWAN are progressing towards establishing always-connected environments, but by reasonable estimates, this will not happen in the near future. This assumption can be based on factors like pricing issues and global coverage. On a similar note, advanced technologies (e.g., fuel cells) have not been completely brought into production quality, thereby limiting the battery life of mobile devices based on current technology.

Enterprise systems are gravitating towards SOA-centric implementations because of the simplicity of integration of diverse architectural implementation elements. SOA or service-oriented architecture refers to an application architecture in which all functions, or services, are defined using a description language and have invokable interfaces that are called to perform some business logic. Each interaction is independent of each and every other interaction and the interconnect protocols of the communicating devices (i.e., the infrastructure components that determine the communication system do not affect the interfaces). At its most basic, an SOA is a collection of services on a network that communicate with one another. The services are loosely coupled (meaning that an application does not have to know the technical details of another application in order to talk to it), have well-defined, platform-independent interfaces, and are reusable. SOA is a higher level of application development that, by focusing on business processes and using standard interfaces, helps mask the underlying technical complexity of the IT environment. Because service interfaces are platform-independent, a client from any device using any operating system in any language can use the service.

By leveraging a loosely coupled interface-centric model, SOA allows applications with distinct boundaries to be easily integrated with one another, in contrast to the complex integration efforts brought about by earlier enterprise application integration (EAI) efforts. Services are being built as abstractions across legacy systems, ERP systems, and enterprise systems. They are also being used to integrate into Portals, Business Processes, and the like. In such an environment, access to these services is made either from within the enterprise or from trading partners in a connected fashion. A physical network connection between the service consumer and the service provider enables real-time service provisioning by the provider. Extending this architectural pattern to mobile applications seems like a natural progression in enabling mobile applications to perform and access enterprise resources similarly to normal enterprise applications. This would enable mobile applications to become an integral part of an enterprise's Information Technology (IT) ecosystem thereby extending the reach of enterprise data all the way to the edges of this network.

In reality, this is easier said than done based on the previously mentioned characteristics of mobile devices. In traditional SOA, for example, there is the assumption that a service provider is always available to provision services when accessed by consumers. There is no concept of an intermediary that can handle the disconnected nature of mobile devices. With the absence of a persistent network connection between the service consumer, which in this case is an application on the mobile device, and the service provider, service invocation for business data access is problematic. Also posing a problem is the battery drainage resulting from persistent radio activity for network access, if a mobile application performs the role of service provider enabling services on mobile devices.

Today, synchronization solutions exist to synchronize the data of occasionally-connected devices. For example, using Puma Technologies' synchronization software (Intellisync®), one can synchronize the file systems or data sets of different devices. That approach is tied to synchronizing data—for instance, a data set that is occasionally updated (e.g., user contacts database). However, the synchronization of databases or file-based data sets itself does not lend any support to the problem of how one would support the notion of disconnected invocation of services. In particular, prior art approaches do not have a mechanism that would support a view of synchronization of data in the context of services. This is particularly important since enterprise applications today are being built to access data through services, not by directly accessing databases.

Although a database (or similar) may be used as a synchronization persistence mechanism, what is needed is a solution that provides a service view of the synchronization medium. For example, instead of accessing information from a database, the information is instead accessed as a service. Given that enterprise applications built today are being designed to access data through services, what is needed is a solution that provides a service view of the synchronization medium that supports the disconnected invocation of services. The present invention fulfills this and other needs.

SUMMARY OF INVENTION

A system and methodology providing service invocation for occasionally connected computing devices is described. In one embodiment, for example, in an occasionally connected computing environment, a method of the present invention is described for providing deferred invocation of services for a mobile device, the method comprises steps of: for a particular service to be supported, creating a device-side object for receiving invocation requests from an application running on the mobile device; intercepting at the device-side object a request from the application for invocation of the particular service, thereby deferring actual invocation of the particular service at that time; while the mobile device is connected, synchronizing the device-side object with a server-side object residing on a server, that passes the service request on to a service provider for actual invocation; and while the mobile device is connected, passing back any result from the actual invocation back to the mobile device for use by the application.

In another embodiment, for example, in an occasionally connected computing environment, a system of the present invention for providing deferred invocation of services for a mobile device is described that comprises: an application running on a mobile device; a device-side object providing mobile support for a particular service from a server, the device-side object intercepting any requests from the application for invocation of the particular service, thereby deferring actual invocation of the particular service at that time; and a server-side object residing on the server that passes the requests on to a service provider for actual invocation while the mobile device is connected, and returns any result from the actual invocation back to the mobile device for use by the application.

BRIEF DESCRIPTION OF DRAWINGS

FIG. 5 illustrates an instance of WSDL extensions that are used to capture the "cacheability" of a service.

DETAILED DESCRIPTION

Glossary

Figure 1:
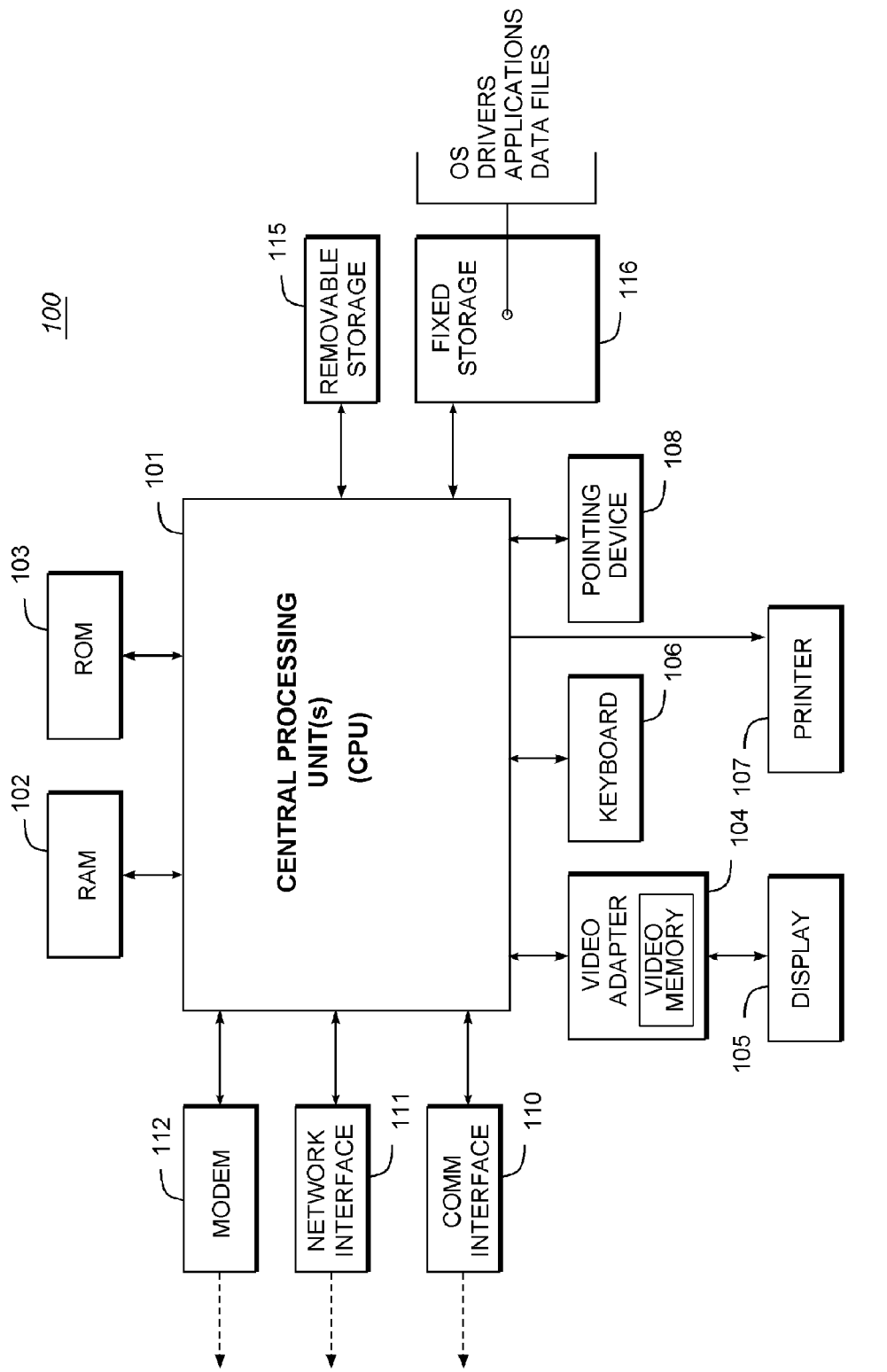
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

HTTP: HTTP is the acronym for HyperText Transfer Protocol, which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in "RFC 2616: Hypertext Transfer Protocol—HTTP/1.1," the disclosure of which is hereby incorporated by reference. RFC 2616 is available from the World Wide Web Consortium (W3C), and is available via the Internet (e.g., currently at www.w3.org/Protocols/). Additional description of HTTP is available in the technical and trade literature, see e.g., Stallings, W., "The Backbone of the Web," BYTE, October 1996, the disclosure of which is hereby incorporated by reference.

J2EE: This is an abbreviation for Java 2 Platform Enterprise Edition, which is a platform-independent, Java-centric environment from Sun Microsystems for developing, building and deploying Web-based enterprise applications. The J2EE platform consists of a set of services, APIs, and protocols that provide functionality for developing multi-tiered, web-based applications. For further information on J2EE, see e.g., "Java 2 Platform, Enterprise Edition Specification, version 1.4", from Sun Microsystems, Inc., the disclosure of which is hereby incorporated by reference. A copy of this specification is available via the Internet (e.g., currently at java.sun.com/j2ee/docs.html).

Java: Java® language is a general purpose programming language developed by Sun Microsystems. Java is an object-oriented language similar to C++, but simplified to eliminate language features that cause common programming errors. Java source code files (files with a .java extension) are compiled into a format called bytecode (files with a class extension), which can then be executed by a Java interpreter. Compiled Java code can run on most computers because Java interpreters and runtime environments, known as Java virtual machines (VMs), exist for most operating systems, including UNIX®, the Macintosh® OS, and Microsoft Windows®. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper," Sun Microsystems Computer Company, October 1995, the disclosure of which is hereby incorporated by reference. For additional information on the Java programming language (e.g., version 2), see e.g., "Java 2 SDK, Standard Edition Documentation, version 1.4.2," from Sun Microsystems, the disclosure of which is hereby incorporated by reference. A copy of this documentation is available via the Internet (e.g., currently at java.sun.com/j2se/1.4.2/docs/index.html).

Java Message Service: Java Message Service (JMS) is an application program interface (API) from Sun Microsystems that supports the formal communication known as messaging between computers in a network. JMS provides a common interface to standard messaging protocols and also to special messaging services in support of Java programs.

JDBC: JDBC is an application-programming interface (API) that provides database access from the Java programming language. JDBC allows Java applications to access multiple database management systems. A set of interfaces is included in the standard JDBC API for opening connections to databases, executing SQL commands, and processing results. Each relational database management system usually requires a driver to implement these interfaces. A JDBC driver manager typically handles multiple drivers that connect to different databases. Accordingly, JDBC calls are generally sent to the JDBC driver manager, which passes the call to the driver for interacting with the specified database. For further information on JDBC, see e.g., "JDBC 3.0 API Documentation", from Sun Microsystems, the disclosure of which is hereby incorporated by reference. A copy of this documentation is available via the Internet (e.g., currently at java.sun.com/products/jdbc/download.html#corespec30).

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

RPC: RPC stands for remote procedure call, a type of protocol that allows a program on one computer to execute a program on another computer (e.g., a server computer). Using RPC, a system developer need not develop specific procedures for the server. The client program sends a message to the server with appropriate arguments and the server returns a message containing the results of the program executed. For further description of RPC, see e.g., RFC 1831 titled "RPC: Remote Procedure Call Protocol Specification Version 2", available from the Internet Engineering Task Force (IETF), the disclosure of which is hereby incorporated by reference. A copy of RFC 1831 is available via the Internet (e.g., currently at www.ietf.org/rfc/rfc1831.txt).

SOAP: SOAP stands for Simple Object Access Protocol, which is a standard and lightweight protocol for exchanging information in a decentralized, distributed environment. It uses XML to encode remote procedure calls, and typically uses HTTP as a communications protocol. For more information about SOAP, see e.g., "SOAP Version 1.2 Part 1: Messaging Framework" and "SOAP Version 1.2 Part 2: Adjuncts," both World Wide Web Consortium (W3C) candidate recommendations dated Dec. 19, 2002, the disclosure of which are hereby incorporated by reference. Copies of these documents are available from the W3C, and are available via the Internet (e.g., currently at www.w3.org/2002/ws).

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", the disclosure of which is hereby incorporated by reference. A copy of RFC 1180 is available via the Internet (e.g., currently at www.ietf.org/rfc/rfc1180.txt).

WSDL: WSDL stands for Web Services Description Language, which is an XML format for describing network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate. For further information on WSDL, see e.g., "Web Services Description Language (WSDL) 1.1", W3C Note, Mar. 15, 2001, the disclosure of which is hereby incorporated by reference. A copy of this document is available via the Internet (e.g., currently at www.w3.org/TR/wsdl).

WSIF (Web Services Invocation Framework): WSIF is a simple Java API for invoking Web services, no matter how or where the services are provided. WSIF enables developers to interact with abstract representations of Web services through their WSDL descriptions instead of working directly with the Simple Object Access Protocol (SOAP) APIs. With WSIF, developers can work with the same programming model regardless of how the Web service is implemented and accessed. WSIF allows stub-less or completely dynamic invocation of a Web service, based upon examination of the metadata about the service at runtime. It also allows updated implementations of a binding to be plugged into WSIF at runtime, and it allows the calling service to defer choosing a binding until runtime.

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0", (2nd Edition, Oct. 6, 2000) a recommended specification from the W3C, the disclosure of which is hereby incorporated by reference. A copy of this specification is available via the Internet (e.g., currently at www.w3.org/TR/REC-xml).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth® wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
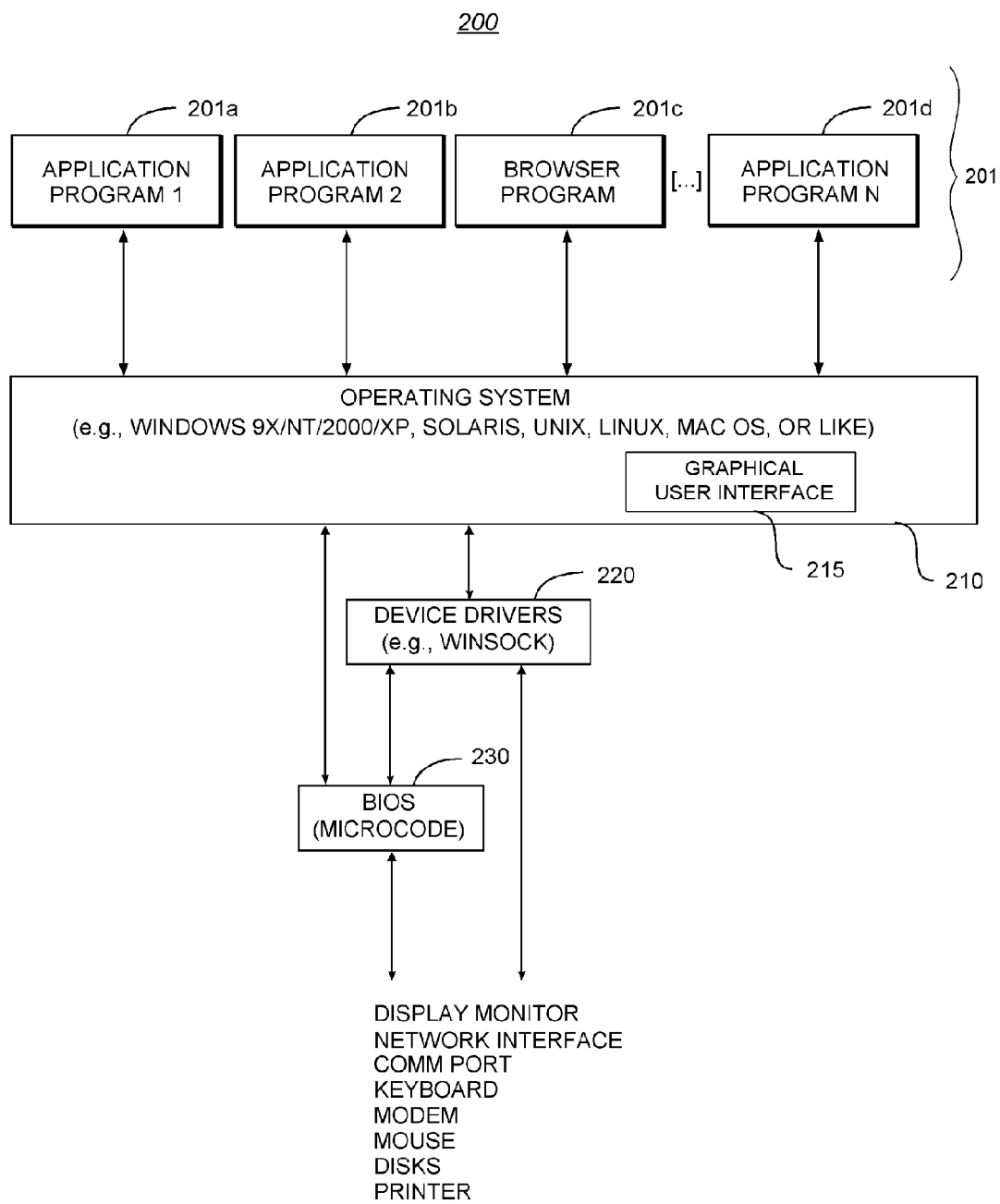
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers and/or mobile devices). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of Service Invocation by Occasionally Connected Devices

With the recent trends in mobile computing platforms (processor speed, memory, storage, etc.), enterprises are looking to empower their employees, customers, and partners with always-accessible applications. A fundamental problem plaguing software architectures for such applications is the absence of network connectivity in some conditions, also referred to as occasionally connected computing (OCC). Traditional mobile applications have been based on thin client architectures using protocols like the Wireless Application Protocol (WAP) that assume network connectivity. Because of this restriction and intermittent network connectivity, these applications are not really suitable for business applications on mobile devices. This initiated what is known as "Smart Client" technology where device resident data and logic make the application accessible in disconnected situations. This brought about a new set of problems including synchronization of data between mobile device and enterprise systems, development cycles for business logic executing on a device, integration with enterprise systems like SAP, and so forth.

In accordance with the present invention, a service oriented architecture is extended to mobile devices and other occasionally connected devices. More particularly, this allows services to be accessed in a deferred format and manner. Accordingly, the present invention includes methodologies for handling connectivity/disconnectivity issues in a transparent, automated manner. In contrast to conventional synchronization mechanisms, the approach of the present invention allows one to access resources that one does not have direct access to (i.e., resources that one only has service-based access to). For example, in order to access data residing in a PeopleSoft system, one is required to go through the PeopleSoft API (services), as direct access is not provided to access the data residing in a PeopleSoft system. In accordance with the present invention, service-based APIs such as PeopleSoft can instead be made accessible in an off-line mode.

The present invention is embodied in a Disconnected Service Computing Object System (DISCOS) that adopts a service oriented architecture (SOA) for building mobile applications. By providing a consistent and transactional view of the enterprise data in the context of disconnected devices, DISCOS allows mobile applications to perform significantly closer to enterprise applications. By adopting various intelligent service computing object replication techniques, execution nodes perform significant business logic needed for a mobile application to add real business value to an enterprise. Primary patterns that are supported by DISCOS include the following: replication of services and their execution environments in their entirety to devices along with necessary metadata; transactional replication of service object invocations from device to enterprise and vice-versa; and creation of normalized data-model equivalent to service invocation accessible to service objects. By supporting such patterns, DISCOS allows developers creating mobile applications to use the benefits of SOA and still provide a powerful business application in OCC environments.

DISCOS addresses the shortcomings present in prior art approaches. By employing replicate service computing objects, DISCOS provides a view of service invocation data in disconnected environments. In the currently preferred embodiment, the system utilizes Web Service Description Language (WSDL) as the interface between mobile applications and enterprise data, thereby adopting the standards based approach in connecting multiple endpoints. Service Computing Objects (SCO) are provided that allow transparent transition between online and offline situations. In some cases, the SCO is an equivalent replica of the actual service provider. Prior art attempts, in contrast, concentrated on providing a cached service, which is not feasible in many situations where the service provider performs some additional logical operations before sending out the response. DISCOS provides an explicit separation of request and response handling in an asynchronous fashion to enable disconnected access to service data.

In this manner, one is now able to create applications on mobile devices that access local "mobilized" services. This functionality is exposed to application developers by generating code (Java beans) for usage on the device (side). The generated code is then used by the application developer in his or her own design-side development tool to build the target application. In this manner, the generated code can serve as a proxy for service (requests) going into and coming out of the device. As described below, the generated code operates in conjunction with client-side and server-side infrastructures, which interact in a manner to perform the required service invocations.

System Components

Figure 3:
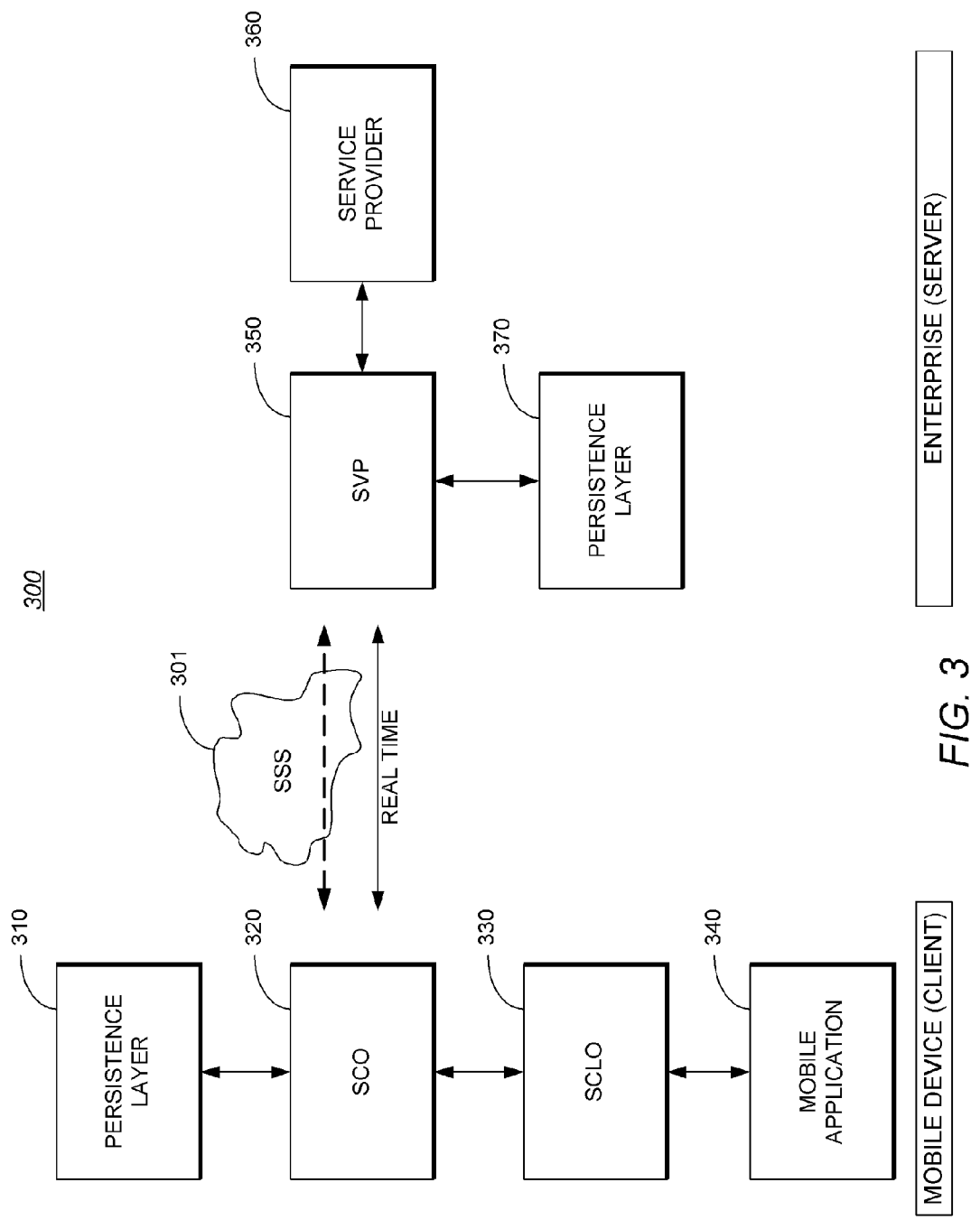
FIG. 3 is a high-level block diagram illustrating a system component view or perspective of the Disconnected Service Computing Object System (DISCOS), embodied as a client-server "interceptor" embodiment of the present invention.

FIG. 3 is a high-level block diagram illustrating a system component view or perspective of the Disconnected Service Computing Object System (DISCOS) 300, embodied as a client-server "interceptor" embodiment of the present invention. As shown, the system 300 includes device or client-side components comprising a client-side persistence layer 310, a service computing object (SCO) 320, a service client object (SCLO) 330, and a mobile application 340. On the server (enterprise) side, the system comprises a service view provider (SVP) 350, a server-side persistence layer 370, and a service provider 360. The client-side and server-side components are connected together via a service synchronization system (SSS) 301. The SSS 301 may be embodied using existing connectivity/server synchronization software (e.g., Sybase® MobiLink), for exchanging serialized packets (i.e., serialized RPC invocations).

The service computing object (SCO) 320 is the service provider proxy on the mobile device that operates in conjunction with the service client object (SCLO) 330 to provide a client-side replica of the corresponding service-oriented object (for handling the service invocation requests) that the system would otherwise have performed in real-time on the server side had the mobile device actually been connected to the server. The service view provider (SVP) 350 is the enterprise resident service provider proxy. In a typical configuration, the server-side proxy runs on an application server (e.g., Sybase® Enterprise Application Server (EAS) or BEA Weblogic server), which in turn communicates directly with the service provider (e.g., PeopleSoft service provider exposing API via SOA). The service synchronization system (SSS) 301 allows the exchange of service invocation between the SCO 320 and the SVP 350. The mobile application 340 simply refers to application software running on the mobile device. The mobile application 340, during its execution, will seek the services of a service provider (e.g., PeopleSoft) which is represented by the enterprise or server-side service provider (component) 360.

Consider, for instance, application of the technology for the purpose of "mobilizing" PeopleSoft services. Here, the client-side SCO 320 is created as a client-side replica or proxy for the PeopleSoft services. This proxy functions as an interceptor to intercept service requests (seeking to invoke the PeopleSoft API) coming from the mobile application 340. This operates in conjunction with the client-side persistence layer 310 which takes care of the real-time persistence of requests when there is no connection active.

From the perspective of the mobile application 340, the PeopleSoft services appear to be available (by virtue of the client-side proxy), despite the fact that the mobile device itself may in fact be disconnected. Thus, the mobile application 340 may in fact invoke PeopleSoft services on the proxy object. Ultimately, the client-side proxy will communicate with the server-side proxy/infrastructure (i.e., at the point when the mobile device is reconnected).

Upon reconnection of the mobile device, the server-side infrastructure de-serializes the invocations and undertakes the corresponding appropriate service invocations (e.g., RPC invocations) against the real service provider (e.g., invoke the actual SOA method that is exposed by the service provider). Note that the server may be serving a multitude of target clients or devices concurrently. The results of those real invocations may then be exchanged or synchronized with the client-side proxy, as the current state of connectivity permits. If necessary, the results may be persisted for future connectivity sessions, by storing the results at the server-side persistent layer 370 (until such time as future connectivity is acquired). Throughout the entire process, the manner in which the client-side proxy resolves the service requests is completely transparent to the underlying mobile application.

Detailed Client-side Infrastructure

Figure 4:
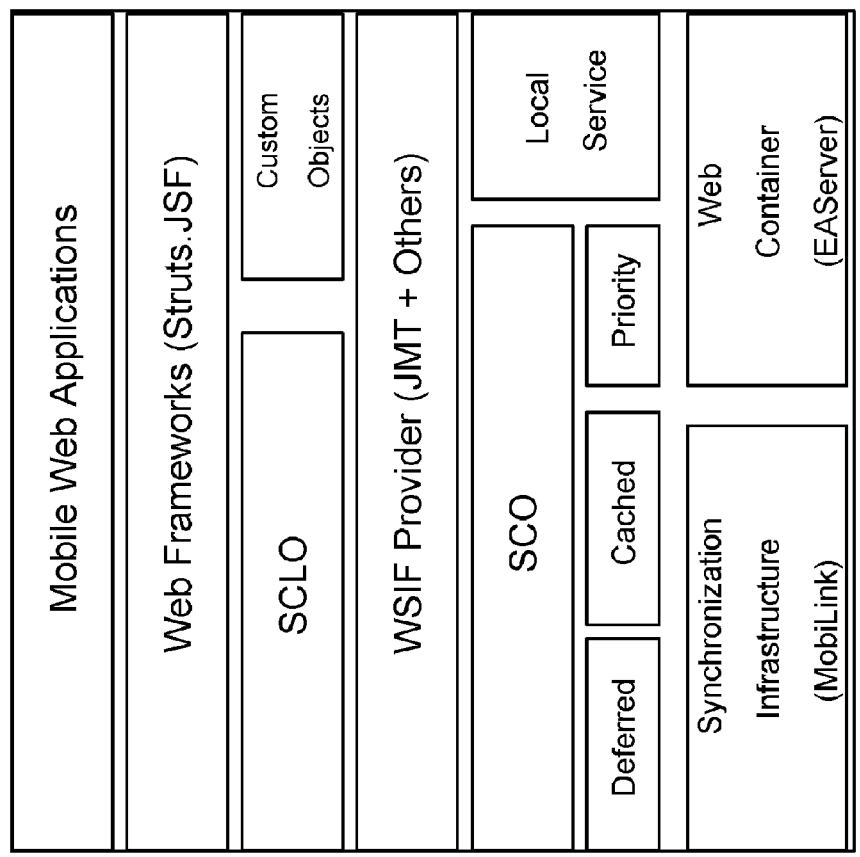
FIG. 4 is a block diagram illustrating a detailed view of the client-side infrastructure.

FIG. 4 is a block diagram illustrating a detailed view of the client-side infrastructure 400. The synchronization infrastructure (MobiLink) and the Web container (EAServer) represent infrastructure that the service computing object (SCO) and other client-side components may be built on top of. The client-side components will now be described in further detail.

Service Computing Object (SCO)

The SCO is the service provider proxy on the mobile device. As shown, the SCLO interacts with the SCO on the mobile device. Applications accessing the service using the SCLO are hidden from the existence of a proxy to the actual service provider. The SCO transparently routes the service request to the concrete SCO implementation based on the mobile quality of service (QOS) criteria described in an extended WSDL file. Behavior of the SCO is determined by this metadata captured in the service definition file by extending the WSDL file and by a combination of deployment time operations. The SCO controls a local persistence mechanism that allows for various types of service invocations.

If the service metadata defines a cached behavior, client invocations into the SCO are responded to with data that was synchronized with the SVP. If the service QOS allows for a real-time connection to the actual service provider in the presence of a connection, the SCO seamlessly interacts with the service provider directly. If the service extends WSDL by allowing for asynchronous invocation of the operation, the SCO provides the intermediation to correlate the requests and responses and provide notification mechanisms so that the application can query for the status of a pending queued operation. By performing deployment time optimizations, some service providers can be replicated in their entirety on mobile applications. In this case, services are executed locally on the mobile device enabling the application to be functional to a larger extent.

The SCO interacts with an invocation synchronization system to maintain a consistent state between the mobile device and the enterprise (server). This synchronization is controlled intelligently by various factors including connection speed, user location, and other contextual information that can be statically defined in the SVP configuration or can be dynamically determined at runtime. Cache invalidation is built into the interactions between the SCO and the SVP so that if any of these real-time or queued service invocations invalidate the cache, the cache gets cleaned up based on the relationship established at design time in the extended definitions for the service. In accordance with the present invention, the DISCOS system defines the model for extending WSDL as extensions to WSDL to allow existing tools to continue creating service descriptions as previously done and to provide easy plug-ins to control the extensions.

The SCO is adaptive in nature. In particular, the SCO looks at the metadata of the service invocation, which itself is defined in a separate XML file (WSDL file) that is created at design time (typically, based on an existing WSDL file). For example, as PeopleSoft may provide a WSDL file in order to expose its services, a designer may use that vendor-provided WSDL file at design time in order to mobilize those services. Here, a new WSDL file is created based on the existing vendor-provided WSDL file. The newly created file includes the particular options that the developer chooses at design time. For example, the developer may specify that the service is deferred, cached, high priority, and the like. This information is captured as metadata at design time and stored in a new WSDL file, which in turn is deployed at the device together with the service control object for the particular service to be invoked.

FIG. 5 illustrates an instance of WSDL extensions that are used to capture the cacheability of a service. Furthermore, by identifying the various input parameters that need to be acted upon, responses are pre-fetched and available for offline use. New grammar is introduced to support the use of operations to retrieve the pre-fetch input parameters. In this manner input messages for pre-fetching could be based on an invocation of a different operation.

Service Client Object (SCLO)

As shown in FIG. 4, the SCLO presents the application layer with the interfaces for service invocation. Here, the SCLO is generated code that provides the API for developers to access a given service. It hides the complexity of the SCO from the application developer by providing a simple interface for accessing the service. By allowing registration of listeners for notification, applications can be notified of the completion of a queued service invocation. It also exposes an interface to query for the state of queued service invocation based on some correlation identity. These correlation identities are globally unique to let the system consistently bind the requests and responses. Furthermore, the correlation subsystem provides for persistence of identities allowing devices to be powered off between requests and responses to conserve battery life. The SCLO exposes the request and response types in uniform fashion based on standard XML to language mapping so that developers can handle the input and output parameters easily. Code generated is accessible from Java Web Application frameworks, including Struts (Java beans as access mechanism) and JSF (Managed beans as access mechanism).

These objects are low footprint as the bulk of the handling is delegated to the SCO. A service access by the application translates down into populating the request parameters and handing it over to the SCO for request handling. If this were a cached operation, the SCO would immediately return the response object of the invocation. Similarly if this were a real-time service invocation, a similar operation would be performed by the SCO, although the response is returned as the result of actual interaction with the SVP. In contrast if the application uses a queued service, the SCO queues the request and provides the response to listeners when requests are played back through the SVP.

The SCLO represents an object used by the application developer during application development, and which is included with the developed application once deployed at the mobile device. In the currently preferred embodiment, there is one service client object for each target API call (e.g., PeopleSoft API) being mobilized—that is, one per operation. Each service client object interacts with the SCO, which embodies core client-side infrastructure that determines the current state of network connectivity.

A service by itself does not define the characteristics that are necessary for mobilizing it. Therefore, in accordance with the present invention, the service client objects and the SCO may be further configured by metadata that is collected during design time development of the mobile application. For example, during application development, the developer may specify that a particular service needs to be "deferred" or "cached" if there is no connection. Such specifications may be captured in metadata that is provided to the service computing object at runtime, so that it may take the appropriate (specified) action in the face of a given connectivity state. The metadata itself is accommodated via an extension to WSDL. All told, the metadata allows the developer to specify how the service computing object should treat a particular service request under different connectivity conditions. Note from the perspective of the mobile application itself, however, it does not necessarily need to be concerned about what the characteristics are (e.g., deferred versus cached) for a given service.

In the currently preferred embodiment, the client-side components run in a Web Service Invocation Framework (which itself is an open source standard). Web Services Invocation Framework (WSIF) is a technology used to extend Web services. The framework can be used to define new providers in a non-proprietary manner. The WSIF provider used in the currently preferred embodiment of the present invention supports several different service models: cached, priority, and deferred. Various service operation modes are also supported. The generated objects (code) use the run-time infrastructure through standard interfaces (provided by WSDL). These generated objects can be deployed as Java beans used by Web frameworks, such as Struts.JSF (i.e., Java-based Web application frameworks). Therefore, in the currently preferred embodiment, the mobile Web applications are embodied as Java applications that access the generated objects as Java beans. The beans include the program logic to decide what to do at runtime to achieve the deferred invocation, including accessing the WSDL file for performing the activities in accordance with design time specification.

Synchronization and Server-side Infrastructure

Figure 6A:
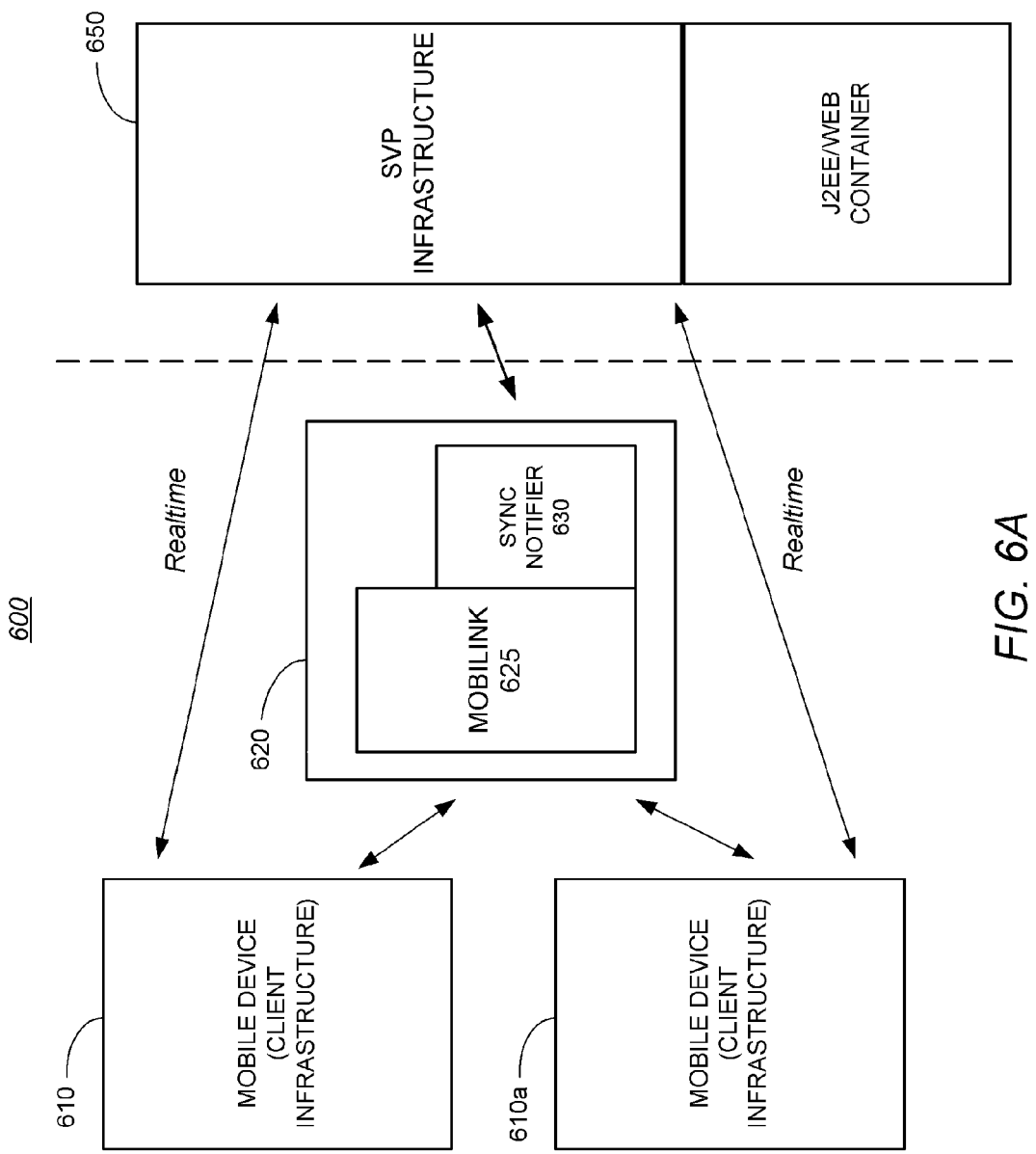
FIG. 6A is a block diagram illustrating a detailed view of the synchronization and server-side infrastructure.

FIG. 6A is a block diagram illustrating a detailed view of the synchronization and server-side infrastructure 600. For context, the diagram shows on the left-hand side the client infrastructures (shown at 610, 610a) that interact with the service synchronization system (SSS) 620. The service synchronization system 620 provides for synchronization of the state of service client objects with enterprise by interacting with SVP infrastructure 650.

Service Synchronization System (SSS)

The service synchronization system 620 is based on a combination of messaging and database synchronization systems that allow offline processing of databases and messages. These are synchronized at connection time to propagate the messages and database transactions to enterprise systems. All the required data for DISCOS is encapsulated in these messages and table data. For the currently preferred embodiment, the SSS 620 provides the runtime infrastructure needed to register for incoming messages that are being pushed by the SVP and SCO layers. These could correspond to cache invalidation messages, cache population messages, responses to earlier invocations, or the like.

Synchronization is therefore the means by which the SCO and the SVP maintain a consistent view. The SCO interacts with the service synchronization system to publish queued service invocations, get cache invalidation messages, maintain cache consistency, receive responses to queued requests, and any other administrative operations that need to be performed in the SCO or the SVP. The DISCOS system defines the model behind the synchronization data so that the SCO and the SVP are on a common schema. Queuing and database synchronization mechanisms are commonly employed to accomplish this. These operations can be performed across multiple types of connections, including CDMA, Wi-Fi, or the like. Policies are defined to control the synchronization process.

As shown at FIG. 6A, in its currently preferred embodiment the SSS 620 includes as components MobiLink 625 and sync notifier 630. MobiLink 625 includes a client-side agent and a server-side infrastructure, which serve to identify events and data structures that need to be synchronized pursuant to specified configurations (e.g., specified with a design tool). The sync notifier 630 is a plug-in to MobiLink 625 that serves to notify the server-side SVP infrastructure 650 (which is running on a Web container/application server).

In operation, the sync notifier 630 sends a message to the server-side SVP infrastructure 650 to notify it that a synchronization has occurred and that there is some activity/work to be done. The server-side infrastructure interacts with message-driven beans (MDB), which are handling requests that are coming in for deferred ordered, deferred unordered, priority services, and cached services. In the case of priority service, the system essentially functions as a pass-through mechanism that bypasses the synchronization mechanism. In other words, the synchronization mechanism is not used (as it may add some delay), so that the service is handled immediately. Nevertheless in this case, the server-side infrastructure is still employed (for tracking and other processing).

Service View Provider (SVP)

The service view provider (SVP) 650 runs on the server-side and facilitates the invocation of services of provider(s) by client device(s). Interacting with the service synchronization system 620, the SVP 650 receives incoming service requests from the client (device) side, executes the services, and sends back the response to the client. The SVP 650 also provides a view of services collection published in its service repository. The services may include cached services and deferred services.

The SVP 650 provides services to the client when in disconnected mode or in realtime mode. The disconnected mode service is facilitated by messages received from the client for deferred services or for cached services subscribed to by the client. In realtime mode, a realtime servlet provides the services to the client. Any services that are not subscribed to by the client are outside the scope of the SVP.

Cached services are services that are executed at specific time intervals and their output is stored in a cached service response table. The SVP includes a scheduler to invoke these services. In disconnected mode, the SVP 650 invokes a cached service at pre-defined time intervals and saves the response in its cache. This response is provided to the client device when a synchronization is performed. On the other hand, if the service is defined as a deferred service, the SVP 650 invokes the service when it sees a request for that operation from the client during synchronization. The client receives the response at an expected response time.

Figure 6B:
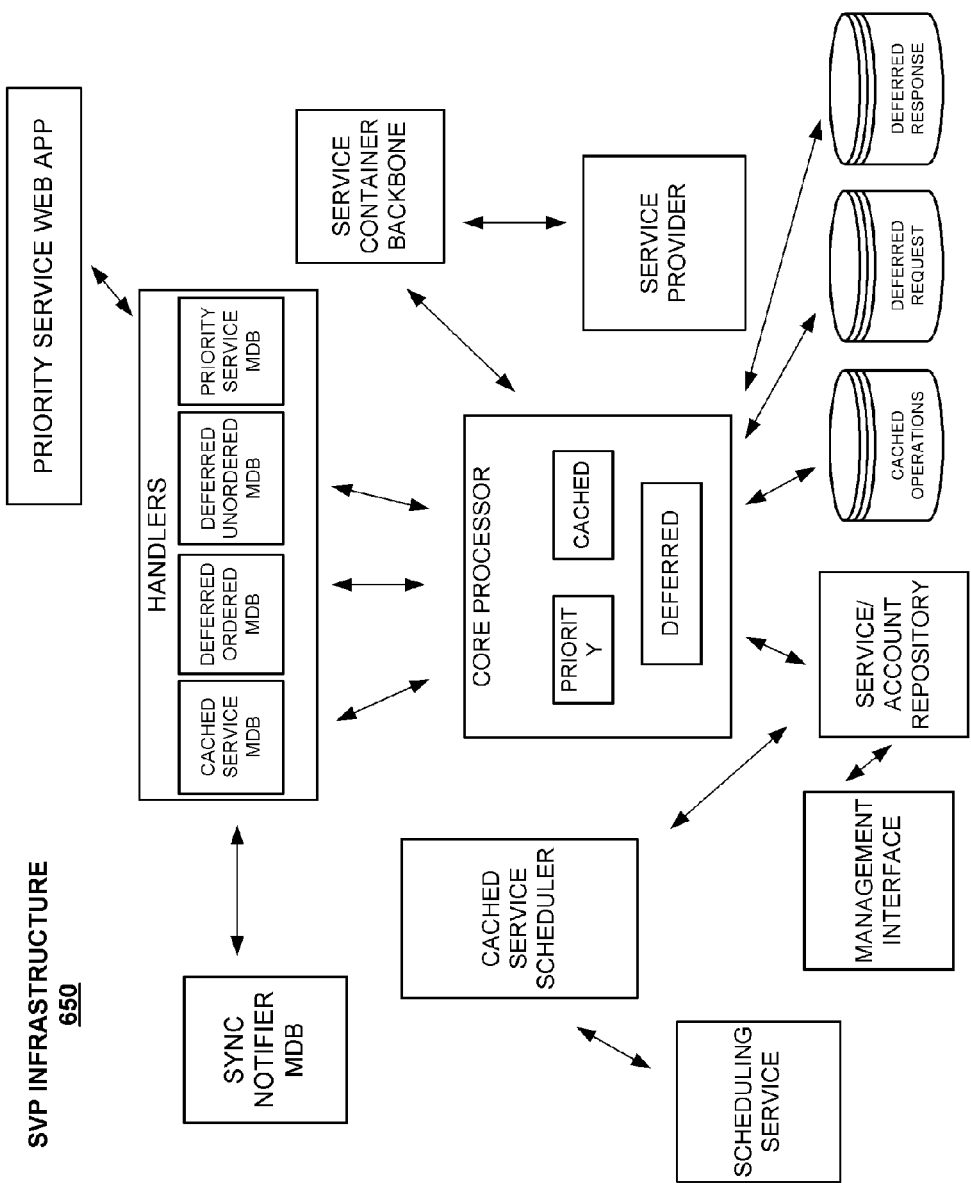
FIG. 6B is a block diagram that shows the SVP infrastructure in greater detail.

FIG. 6B is a block diagram that shows the SVP infrastructure 650 in greater detail. In the currently preferred embodiment, the SVP 650 runs in a J2EE/Web container (as shown at FIG. 6A) and facilitates the consistent and transactional execution of services. The SCO and the SVP are synchronized based on the metadata defined by extending a WSDL file at runtime. Depending on the characteristics of the services, the view generated by the SVP and synchronized back to the SCO varies. In the case of a service with "cache" as QOS, the SVP does pre-fetching of the data based on some initialization conditions. This data is synchronized back to the mobile device based on the interaction between the SCO and the SVP. By uniquely identifying the query parameters that form the input parameters, data is pre-fetched by the SVP to allow for cached execution of services in disconnected mode. WSDL extensions behind the DISCOS system define the cache invalidation criteria such as time interval, other operations that invalidate the cache, and the like.

By being able to "transactionally" replay the footprints of the SCO, consistency of data is maintained by the SVP. The developer can establish such transactional boundaries either in a declarative fashion by using the DISCOS extensions or programmatically using SCLO programming interfaces. This module also allows for the correlation of queued requests and responses so that the SCO can notify listeners on receipt of a response to queued requests. Ideally, this view of data moving back and forth is controlled by various factors thereby optimizing usage of various resources associated with the mobile device.

The view provider performs most of the cache consistency maintenance by keeping track of service invocations flowing through the system and identifying the invalidating operations executed. All of this is transparently executed without any intervention from the client, except for some conflict resolution scenarios. During synchronization, right (i.e., correct) cache entries are populated on the mobile device for future usage.

The service view provider (SVP) is implemented on a J2EE application server to listen for incoming messages from the SCO. These are used to convey messages representing cache access failure, transactional sequence of operation invocation, and the like. A startup component is provided to parse the configuration file identifying all the Web services that need to be executed to populate the cache. This configuration file identifies all the services and the operations in those services based on WSDL file URI's. This configuration file also identifies the dependencies between operations to invalidate the cache based on execution of other operations. This allows the SVP to automatically send cache update messages when one of the invalidating operations is executed.

The SVP uses WSIF on the enterprise side for the actual invocation of services. A similar approach is adopted on the mobile device. WSIF allows the system to conveniently abstract the underlying service binding to allow Service Client Objects (SCLO) and SCO Java classes to access multiple endpoints. In the case of replicated service objects, where the service runtime containers are moved on the mobile devices by plugging WSIF underneath the SCLO, the system is shielded from the different bindings and their access methods. By employing a J2EE runtime container supporting JDBC functionality on the mobile device, services that are marked as replicated and intelligently identified as replicable, are moved completely to the device so that their functionality is available locally. In this case the associated service provider needed data is also moved (e.g., if service provider was a database provider, local access to the database is provided). Generated Java classes access the local database for their persistence mechanism, either to retrieve the cached response to messages or create a transactional store for operation invocations. SCO classes also interact with messaging infrastructure on the device to queue asynchronous invocations of service operations. Requests and responses are correlated based on a globally unique correlation identifier. Applications built to DISCOS use the SCLO interfaces to access the services and their operations.

The SVP includes "context awareness" intelligence/logic to return information based on the current context. For example, the SVP may adapt the format of the result returned to the device as needed for accommodating connection conditions or other extraneous conditions. For a low bandwidth connection, for example, the SVP may return the result as compressed data, or may decide to return just a subset of the data.

When a message is received by the SVP infrastructure 650 (e.g., from the SSS 620 or from a device for priority invocation of services), the incoming message is handed off to a central routing mechanism that performs the initial processing based on various metadata. Ultimately, the message is handed to a core processor which unwraps messages and then hands off the messages to a service container backbone. Specifically, the core processor handles the serializing and the de-serializing of requests and responses. The core processor works in conjunction with message transmission handlers which preprocess incoming and outgoing messages to satisfy the QOS requirements as defined at design time.

A service container backbone is able to invoke the actual service provider. In the case of PeopleSoft as the service provider, for example, the system of the present invention may interact with the PeopleSoft service provider using the service container backbone. The corresponding metadata (e.g., service definition, parameters that need to be queued, etc.) is defined in a corresponding service repository. At design time, the developer uses an SOA tool provided by the system to define the services.

As previously described, it may be necessary to cache certain responses (e.g., because there may not be a current connection to the device). For that purpose, the system includes intermediate database tables to store different responses and requests. The responses will be synchronized back to the client-side infrastructure. The scheduler handles periodic retrieval of responses (based on previously specified parameters). The SVP infrastructure 650 also includes a service/account repository to store service metadata provided at deployment time (e.g., defined caching parameters and service behavior) as well as a management interface for administration.

In the currently preferred embodiment, the management functionality of the SVP is exposed through a Web-based user interface. An administrator can use the interface to add users (accounts), services and applications. Currently, a subscription to a service or application is controlled by roles.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Information Flow on Client Side

Figure 7A:
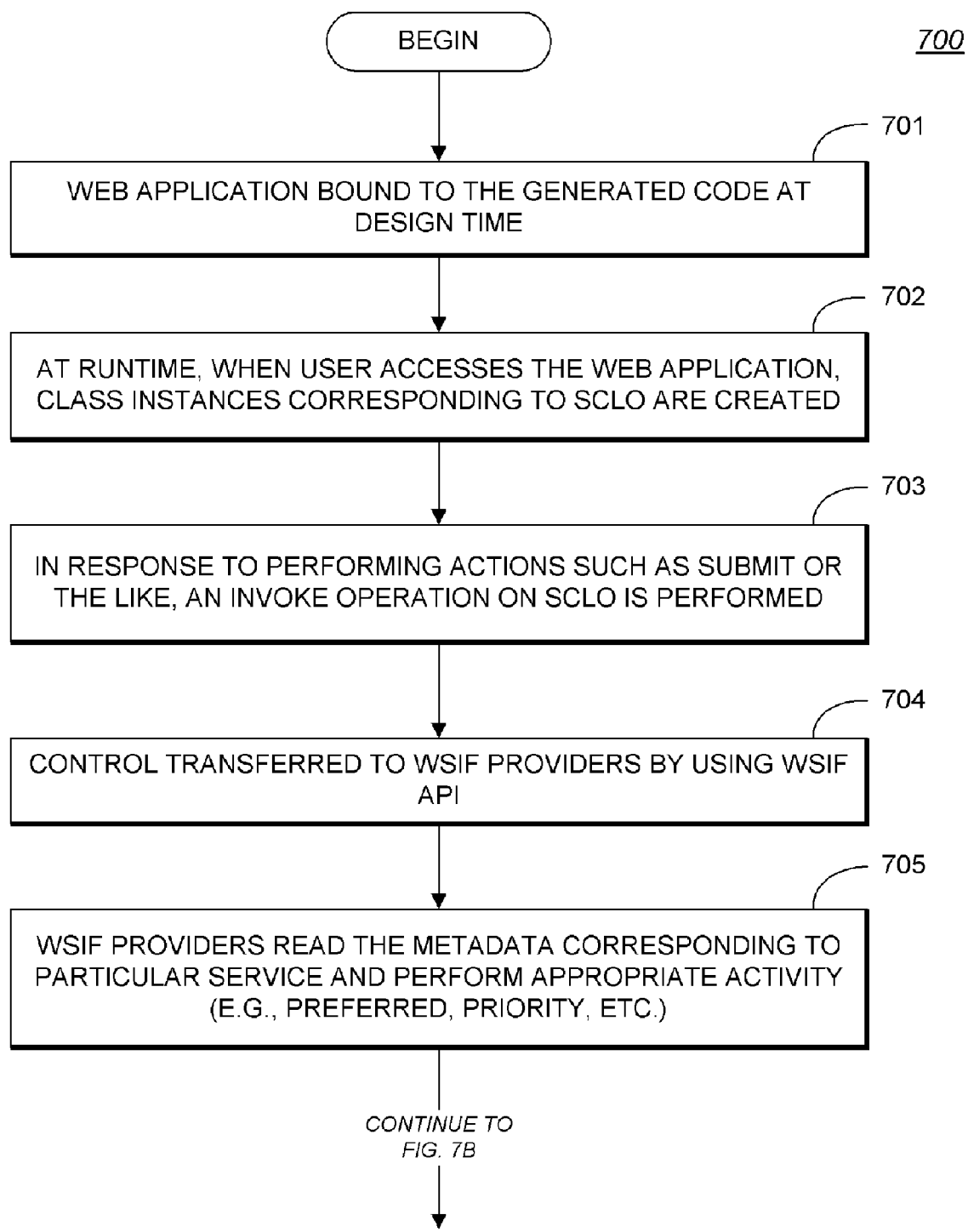
FIGS. 7A-B comprise a single flowchart illustrating the method steps of operation on the client (device) side.
Figure 7B:
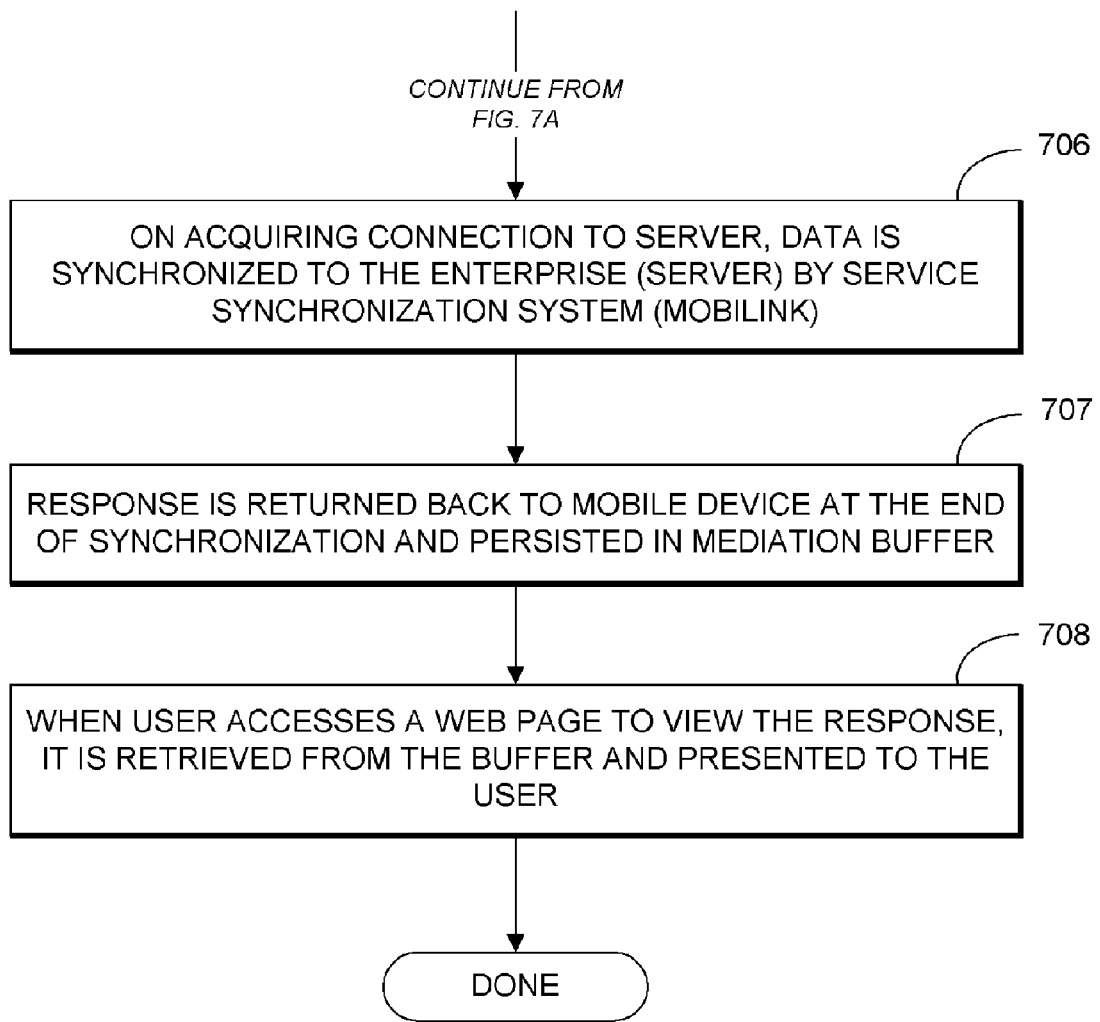

FIGS. 7A-B comprise a single flowchart 700 illustrating the method steps of operation on the client (device) side. At step 701, a Web application is bound to the generated code at design time. At runtime, when a user accesses the Web application, class instances corresponding to SCLO are created at step 702.

In response to the user interacting with the application and performing actions such as a "submit" or the like, an "invoke" operation on SCLO is performed at step 703. At step 704, control is transferred to WSIF providers by using WSIF API, which in the currently preferred embodiment is provided by code in the service computing object (SCO). At step 705, the WSIF providers read the metadata corresponding to the particular service and perform the appropriate activity (e.g., preferred, priority, and so forth). On acquiring a connection to the enterprise (server), at step 706 this (serialized) data is synchronized to the server by the service synchronization system (MobiLink).

After the appropriate invocation/operation is performed on the server side, at step 707 the result/response is returned back to the mobile device at the end of synchronization and persisted in mediation buffer. When the user accesses a Web page to view the response, it is retrieved from the buffer (persistence layer) and presented to the user at step 708.

Operations on Server Side

Figure 8A:
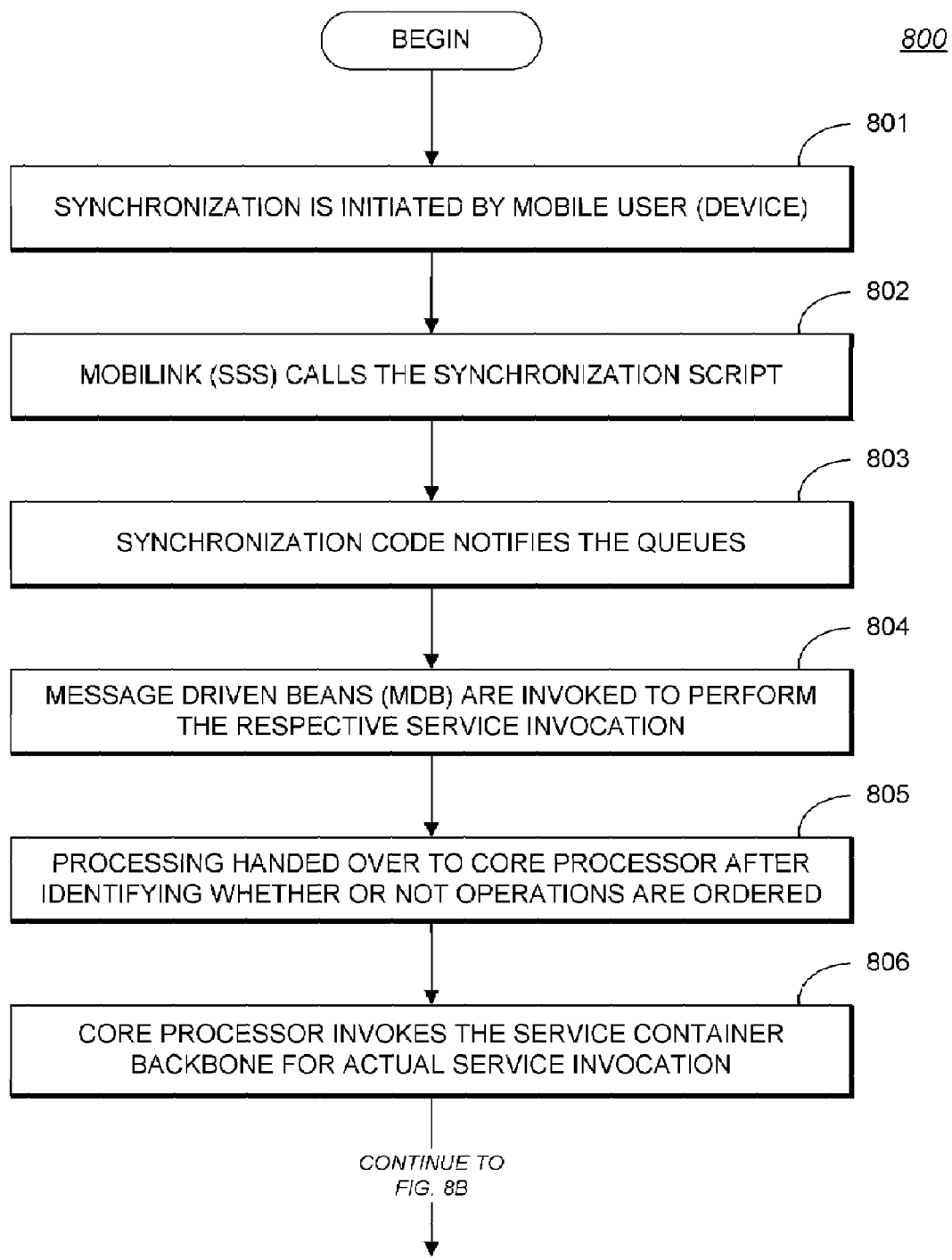
FIGS. 8A-B comprise a single flowchart illustrating the method steps of operation on the server (enterprise) side.
Figure 8B:
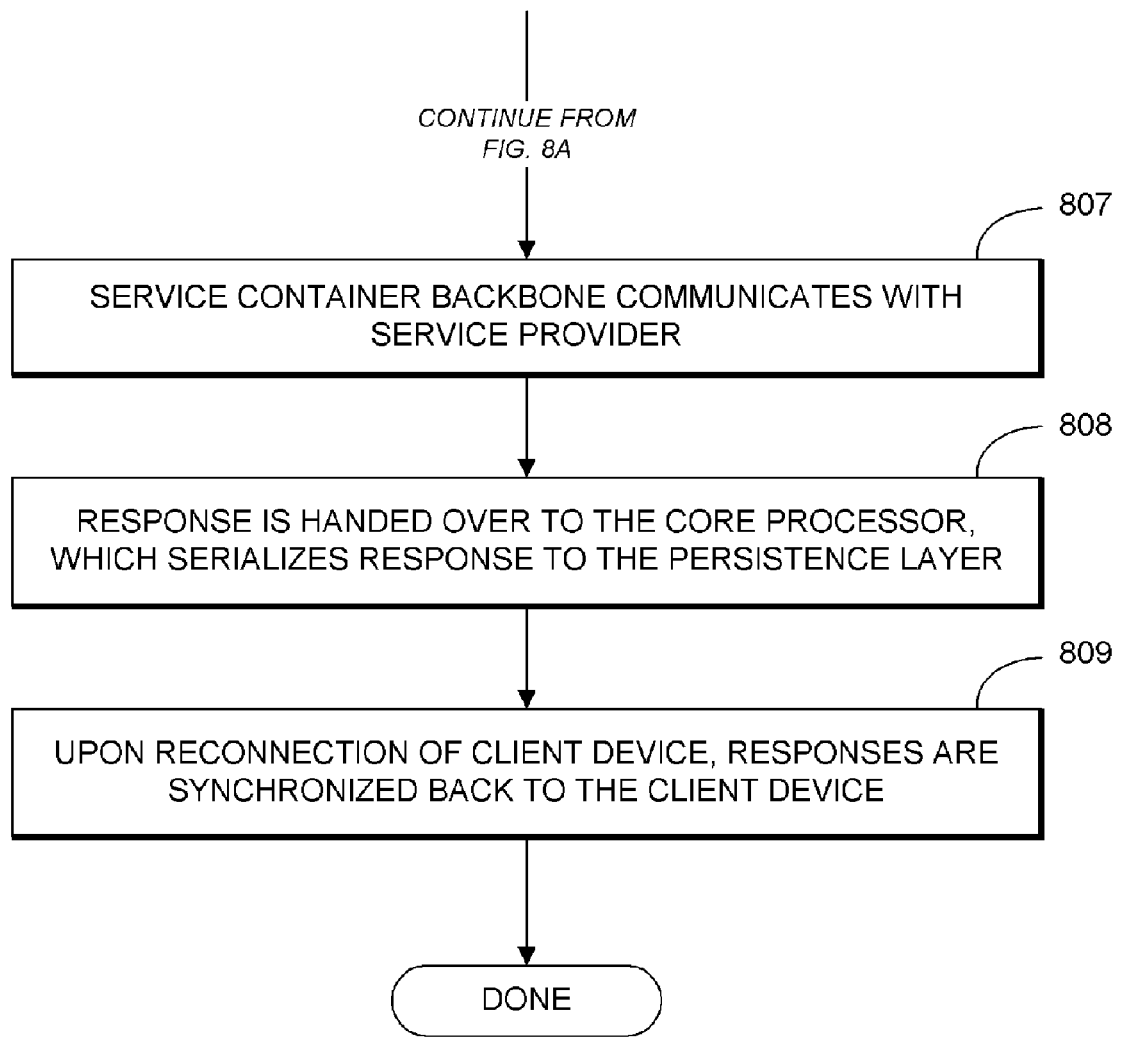

FIGS. 8A-B comprise a single flowchart 800 illustrating the method steps of operation on the server (enterprise) side. At step 801, synchronization is initiated by mobile user (device). At step 802, MobiLink (SSS) calls the synchronization script. At step 803, synchronization code notifies the queues.

Message-driven beans (MDB) are then invoked at step 804 to perform the respective service invocation. At step 805, processing is handed over to the core processor after identifying whether or not the operations are ordered. At step 806, the core processor invokes the service container backbone for actual service invocation. The service container backbone communicates with service provider at step 807.

After operations are performed/response generated at the service provider, at step 808 the response is handed over to the core processor, which serializes the response to the persistence layer. Upon reconnection of the client device, all responses are synchronized back to the device at step 809.

Mobile Service Invocation at Client Device

As described above, the client side invocation framework utilizes a service synchronization system (MobiLink) as the communication infrastructure between the client and the server in an OCC environment to provide a cached and deferred remote services invocation framework. A user can "mobilize" an existing service by adding a JMT extension to its WSDL. Currently, there are four mobilize options defined in the JMT extension as follows: cached, deferred, priority, and queueIfCacheMiss. These options may be combined. A code generation tool is provided to generate a client side service invoke Java bean. An application can then use the generated bean to perform cached or deferred invocation based on the JMT extension in the WSDL. The following describes the processing of each of the mobilization options.

Priority, Cached, and/or Deferred Service Invocation

As a user uses an application at runtime that makes a call into the generated code at the mobile device, the call comes into the provider. The provider operates as follows in handling the call. First, the provider determines whether the invoked service has been mobilized. If not, then the provider does not need to process the incoming call as a mobilized service; the call can be handled as a normal invocation (using conventional/traditional processing technique). Otherwise, the provider will proceed to handle the call invocation as one for a mobilized service.

Figure 9A:
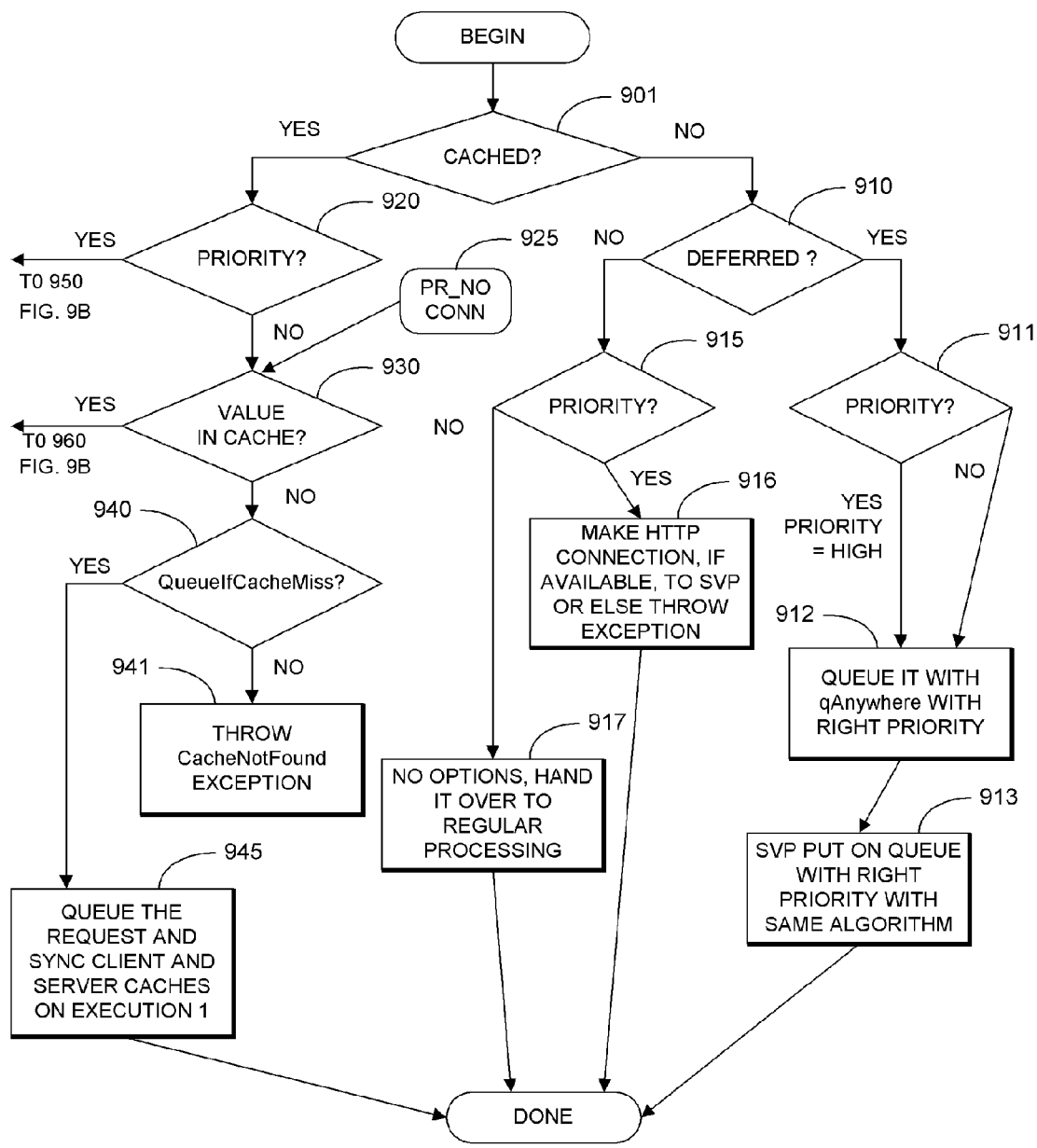
FIGS. 9A-B comprise a single flow diagram illustrating the invocation of a mobilized service on a priority, cached, and/or deferred basis.
Figure 9B:
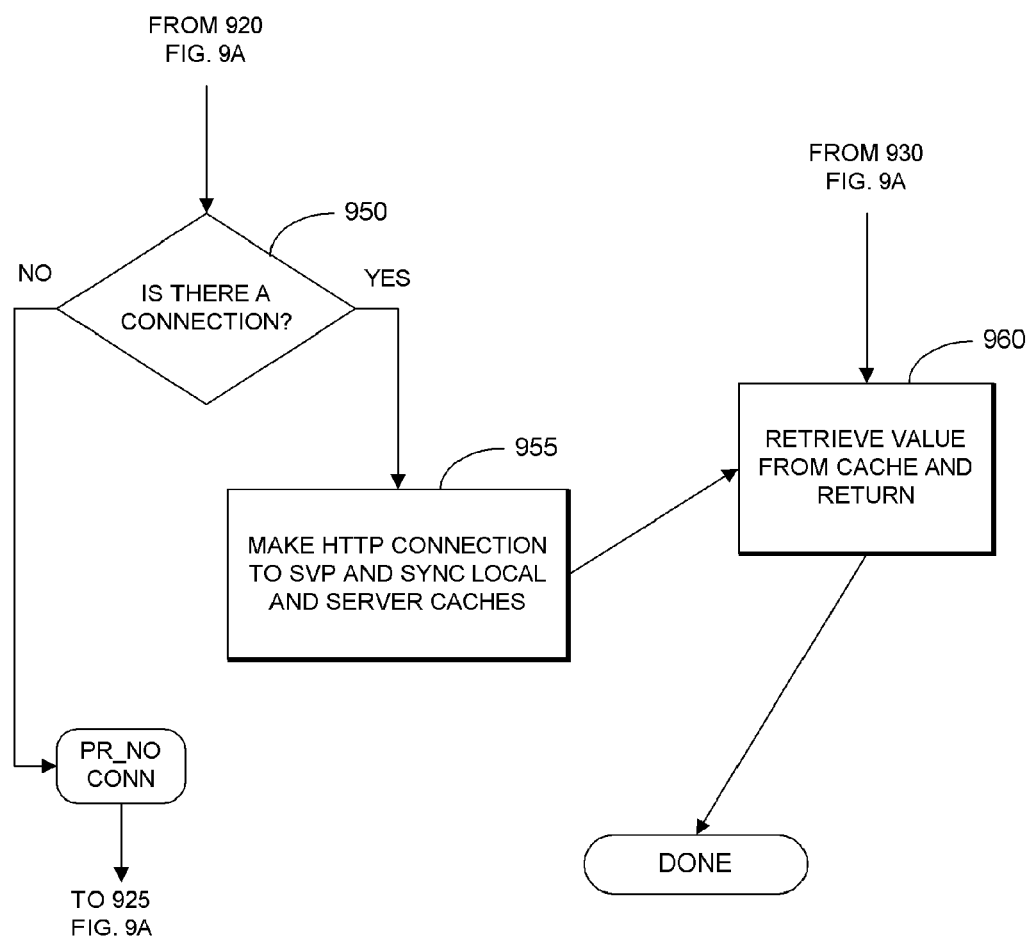

FIGS. 9A-B comprise a single flow diagram illustrating the invocation of a mobilized service on a priority, cached, and/or deferred basis. If the call invocation is for a mobilized service, the provider will determine whether the corresponding mobilized service has a cached option set as shown at 901. If there is no cached option, then the mobilized service will either be deferred or priority, or both, and the processing proceeds to 910. Otherwise, if the cached option is set, the processing proceeds to 920.

If the service has a deferred option at 910, this means that the application may send the request (i.e., service invocation) and is willing to wait for the response. If the service has a deferred option, a check is made as shown at 911 to determine if the service invocation has priority. The priority option means that when the connection is available, the service invocation is to be given high priority. For example, a "deferred, priority" setting indicates that the application can wait for the service invocation, and as soon as reconnection occurs the request is to be given high priority (in order to expedite return of the response).

In the case of high priority, a persisted response is saved with a setting that indicates that the response should be updated (i.e., synchronized back to the device) immediately. In the currently preferred embodiment, the persistent response is stored in a separate priority table that is synchronized back to the device immediately upon establishment of connection. Otherwise, the result is stored in a non-priority table that is synchronized back to the device in due course, upon connection. The queuing of responses based on priority is illustrated at 912, 913 at FIG. 9A.

In the case of service requests that are "priority" but are not "deferred," (i.e., that are not deferred at 910, but are priority at 915), the system opens up an HTTP connection to the server and retrieves the service response right away as shown at 916. Here, since the "deferred" option is not set, the mobile application wants the result immediately. If the result is not available (for whatever reason), an exception is raised. Service requests that do not have the cached option set (i.e., at 901), are not deferred (i.e., at 910) and do not have priority (i.e., at 915), are handed over to regular processing as provided at 917.

Another type of service request is one that does have a cached option set (i.e., as determined at 901). As provided at 920, a check is made as to whether the "priority" option is also set. If the priority option is set at 920, the processing proceeds to 950 at FIG. 9B. As shown, a check is made to determine if there is a connection at 950. If so, the connection to the SVP is made and the local and server caches are synchronized as provided at 955. Otherwise, if the service does not have a priority option at 920 (or if there is no connection to the SVP at 950), the provider checks whether the result (i.e., a response corresponding to this particular request) is in cache as shown at 930 at FIG. 9A.

If the result is in cache at 930, the process proceeds to 960 at FIG. 9B to retrieve the value from the cache and return. However, if the result is not in cache, the provider checks whether the "queue if cacheMiss" option is set as shown at 940 at FIG. 9A. If this option is set at 940, the provider queues the "cache miss" as provided at 945. This allows the system to get the response in a delayed fashion. Queuing the cache miss is similar to the deferred option. The handling of deferred, cached, and priority invocations is described below in greater detail. If the option is not set at 940, a CacheNotFound exception is thrown as provided at 941.

Deferred Invocation

A deferred service invocation request is first put into a mediation buffer stored in the remote database. When the device is connected, the inserted row is sent to the server side via MobiLink synchronization server at upload time. The SVP on the server will look at the new request and send the request to the service provider. When the service provider returns the response, the SVP will update the response to the new request table. The client side will get the results back at the download time of the MobiLink synchronization.

A "context ID" is introduced to let the user distinguish deferred invocations from different context. For example, Web application App1 only cares about its own invocations. It is not interested in seeing invocations from other Web applications for the same operation. In this case, it could set its own context ID so that when it searches previous invocation results, it will not see results from invocations from other context. The context ID could be set in a J2EE container in a J2EE environment, or using a property in J2SE and J2ME environments.

A deferred service invocation can be marked as sequenced, which means the requests should be processed on the SVP in the same order they were invoked on the client side. The SVP provides for handling this sequencing on the server side.

Cached Invocation

To process a cached service invocation request, the client side will first check if the response for the same invocation is in the local "Response Cache Table" (RCT). If the response for the same invocation is there and not expired, the response is available for the caller. Note that "the same invocation" means the same service operation, same input parameters, and the same user name and password. A primary key is created for each different request so that dbmlsync (MobiLink) can update the affected rows correctly. Since the correlation ID is unique, a new correlation ID will be assigned as the primary key.

When cache lookup fails or the result is expired, and the queueIfCacheMiss flag is set, the request is saved in both RCT and the "Cache Request Queue" table (CRQT) of the remote database. At synchronization time, the whole CRQT is uploaded to the server side and then all rows are deleted on the client side. For each CRQT row, the SVP will do the invocation to the service provider and put the response to the RCT. At the synchronization download time, the modified server side RCT entries are downloaded to the client side with the new results.

Real-time Invocation

When a service operation is marked as priority without deferred, the service is called a real-time invocation. The request is sent to the SVP via HTTP or HTTPS, depending upon the server http port configuration. The SVP includes a servlet to handle the request as discussed below. When the SVP receives the request from the client, it makes the actual service invocation to the service provider then sends the response back to the client in its HTTP response.

If the service is also marked as cached, the SVP will also put the response to the server side RCT before returning the response to the client. The client also puts the response to the client side RCT before returning to the caller. It should be noted that a real-time request will fail when the device is not connected.

Service View Provider

The Service View Provider is built using a messaging framework that is facilitated by the MobiLink Synchronization mechanism and Java Message Service. The framework makes it possible to offer deferred services and cached services. The provision of cached services and deferred services is described in more detail below.

Cached Services

Cached services are services that are executed at specific time intervals and their output is stored to a Cached Service Response Table. The SVP includes a scheduler to invoke these services. When a synchronization is performed, the data is synchronized to the device side.

Properties for the cached service currently include the following:

1. WSDL Namespace
2. Service name
3. Port name
4. Operation to be invoked
5. Input message name(s)
6. Output message name
7. 1 or more than 1 Input data in the operation's arguments
8. Cache time
   a. On every sync.
   b. Every number of hour(s)
   c. Daily
   d. Every day(s) (Monday thru Sunday)
9. Last cache accessed time The Cached Service Operations Response table serves as the cache for the mobile application. This cache is kept updated by SVP and cache management includes management of this table. The cache size is effectively the output columns size for all the rows for the user in a table. The Cached Service Operations Response table also includes a last_accessed column which is used by the SVP's cache management logic.

The service client can request a cache service operation for a different input value (queueifCacheMiss). This triggers the cached service processor to dynamically subscribe the client to an additional instance of that cached service with that input value. If the space allocated is not enough the earliest subscribed cache service instance will be unsubscribed (MRU algorithm).

Deferred Service

Deferred Services are services invoked once only on demand. The SVP only makes the service call when it receives the request. The client receives the response at an expected response time.

Properties for deferred services include the following:
1. WSDL Namespace
2. Service name
3. Port name
4. Operation name to be invoked
5. Input message name(s)
6. Output message name
7. Response type
   a. Immediate response—Synchronous service calls
   b. Notified response by the service provider/service container—asynchronous service call, use asynchronous handler The ordering of a deferred service is guaranteed as the rows in the Deferred Operations Table are executed in the order specified by the SEQ column.

Service Class

A Service is typically a Web service, but a service could be any method execution that provides some value to the client. A service operation can execute in one call synchronously or it can execute asynchronously. Currently, a cached service with a single operation is supported only in the synchronous mode. A single or multiple-operations deferred service is either synchronous when all its operations are synchronous or asynchronous when at least one of the operations is asynchronous.

Synchronization Table(s) Dispatcher MDB

The Synchronization Table(s) Dispatcher MDB is activated by a message from the end_synchronization event Java code. The purpose of this MDB is to convert each row in the Cached Service Request Table and Deferred Service Request table into individual messages that can be acted upon by the Ordered Operations Invoker MDB and Non-Ordered Operations Invoker MDB.

A single message is dispatched for each non-order sensitive (ORDER_SENSITIVE bit is not set) operation to the Non-Ordered Operations Invoker MDB. A single message is dispatched for all the order sensitive operations (ORDER_SENSITIVE bit is set) that are in the Deferred Service Request table to the Ordered Operations Invoker MDB. The activation messages are dispatched from within the begin_download synchronization event. This ensures all the uploaded rows are available to the MDBs when the notification message arrives.

The Java MobiLink Synchronization script class polls the Cached Response table and the Deferred Operations Request Table for operations that it wants to wait in the begin_download synchronization event. Even though the notification message has been sent to the dispatcher MDB only in the begin_download event, note that the sending of this message is outside the scope of the transaction that the MobiLink uses to download the rows from the consolidated database to the device. This means the notification will reach the MDBs, where it will be invoked and the tables updated. Once the begin_download event code sees the results of the operations it is looking for or it times out, it can return.

Overlapping synchronization refers to a situation where operations dispatched from the previous synchronization are not complete but the JMT user attempts another synchronization. The Dispatcher MDB works only on the rows that have been uploaded during that synchronization which notified it. This is accomplished by adding another column to the tables in the consolidated database. This column contains the time when the upload_insert event was called. The value is also stored in a class instance variable. This value is used by the begin_download event code while sending the notification message. Another important issue handled during overlapping synchronization is that the MDB invoking the ORDER_SENSITIVE operations waits for the previous ORDER_SENSITIVE operations to complete before starting to process the current operation. This functionality is facilitated by the Rescheduler Singleton MDB described below.

Non-Ordered Operations Invoker MDB

The Non-Ordered Operations Invoker MDB is activated by messages from the Synchronization table dispatcher MDB. Each message is passed a correlation id of the operation it is supposed to invoke. The invoker MDB selects the full information from the Deferred or Cached Request table using the correlation id. It then invokes the operation, and updates the Deferred or Cached Response table.

Ordered Operations Invoker MDB

The Ordered Operations Invoker MDB receives an array of correlation ids to execute from the dispatcher MDB. Before proceeding to execute each one of them in that order, the MDB does a select of rows from the Deferred Operations Table whose sync_id/timestamp column value is less than the value of the timestamp for the first correlation id/operations and the status of the operation is not complete. If any rows are selected, the MDB knows that it cannot run, so it updates the Pending_Operations table with the correlation_id values and the correlation id of the operation it is waiting for to finish. A timestamp and timeout value is also added to this table. Once these correlation ids have been put in the table, the MDB returns.

Rescheduler Singleton MDB

The Rescheduler Singleton MDB is started by a message in the Rescheduler Queue and it runs forever (on Message( ) never returns). Startup code in SVP can check whether the Rescheduler is running and if not queue a message to start it up. This MDB selects rows from the Pending_operations table and sees whether any operations that have been blocking others have completed by checking the Deferred_Operations table. It then queues the operations that earlier did not run by sending a message to the same Order Operations Queue.

Cached Service Scheduler MDB

The Scheduler MDB schedules Cached service operations. It is linked to the Scheduler Queue. The MDB is started once by sending (from an init( ) method of a servlet) a message to the Scheduler queue and the OnMessage never returns (so a single message is in the queue all the time).

The Scheduler MDB emulates a timed sleep by doing a receive( ) on the Interrupt Queue with a finite timeout time. When the Management Bean wants to refresh the scheduler (e.g., when adding a user to the account tables or adding or deleting a service to a user) it sends a message to the Interrupt Queue.

The Scheduler sends a message per cached service operation to the Cached Service dispatcher MDB. This way each operation gets a thread to execute. The Cached Service Dispatcher MDB then uses the Processor POJOs to execute the service. These POJOs directly write to the Cached Service Response table. The Scheduler is stopped temporarily when synchronization is in progress.

Pseudocode for the scheduler MDB is as follows:

```
1: public void onMessage(Message message)
2:   {
3: Context ctx = new InitialContext( );
4: queueConnectionFactory = ctx.lookup("QueueConnectionFactory");
5: Queue interrruptQ = queueConnectionFactory.
lookup("InterruptQueue");
6: queueConnection = queueConnectionFactory.
createQueueConnection( );
7: queueSession = queueConnection.createQueueSession(false,
Session.AUTO_ACKNOWLEDGE);
8: queueReceiver = queueSession.createReceiver(queue);
9: queueConnection.start( );
10: OperationsCache cache = cacheOperationsRepository( );
11:
12: while (true)
13: {
14: LinkedList list = generateListofOperations(cache);
15: Operation tobeinvoked = list.getHead( );
16: long waittime = calculateTime(tobeinvoked);
17: long actualwaittime = waittime;
18:
19: while (true)
20: {
21: Message interruptMsg = queueReceiver.receive(actualwaittime); //
timed sleep
22: if (interruptMsg != null)
23: {
24: // reload from repository
25: cache = cacheOperationsRepository( );
26: actualwaittime = caculateTime(tobeinvoked);
27: }
28: else
29: {
30: break; /// receive timed out
31: }
32: }
33: tobeinvoked.dispatchMessage( );//puts a message in the In Q for the
Processor MDB
34: }
35: }
```

Cached Service Invoker MDB

The Cached Service Invoker MDB receives a message with a service_instance_id for a particular user. It then uses the repository to find the users input values for the service (using the ACCOUNT_SERVICES table). It executes the service and updates the Cached_Response table.

Realtime Interface

The SVP makes use of a PassThru WebService to execute client requests in realtime. The PassThru WebService operates in the RPC/literal mode. It uses the xsd:any type to pass different parameters of different services. The operation name itself is passed as one of the parameters to this PassThru WebService. The any type maps to an array of org.apache.axis.message.MessageElements. A Java type can be converted to a MessageElement or vice versa given its Qname.

The following code illustrates how a Java type (ValueType) with three primitive fields is converted to a MessageElement:

```
1: QName obj2=ValueType.getTypeDesc( ).getXmlType( );
2: ValueType value=new ValueType( );
3: value.setStringProperty("java type");
4: value.setBoolProperty(true);
5: value.setIntegerProperty(new Integer(23));
6:   org.apache.axis.message.MessageElement melem=new
    org.apache.axis.message.MessageElement(obj2, value);
```

On the server side the Java type can be retrieved from the MessageElement as shown below, where TransparentParam is a type with one xsd:any element:

```
1: org.apache.axis.message.MessageElement[ ] elems =
TransparentParam_1.get_any( );
2:     for (int i =0; i<elems.length; i++)
3:     {
4:         org.apache.axis.message.MessageElement elem = elems[i];
5:         System.out.println("QName " + elem.getQName( ));
6:         try
7:         {
8:         ValueType value =
(ValueType)elem.getValueAsType(elem.getQName( ));
9:         System.out.println("value string" +
value.getStringProperty( ));
10:        }
11:        catch (Exception e)
12:        {
13:            e.printStackTrace( );
14:        }
15:     }
```

The Passthru WebService makes any service (i.e., either cached or deferred service) execution possible when the client has network connectivity. In the case of a cached service, the client will pass in the input parameters for the cached service. Currently, only deferred services, which are synchronous, are supported through the PassThru WebService.

It should be noticed that the application programming model does not change for a Deferred service whether in the disconnected or realtime mode. The difference is the results will be available or the asynchronous event handler will fire quickly.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In an occasionally connected computing environment, a method for providing deferred invocation of services for a mobile device, the method comprising:

for a particular service to be supported, creating a device-side object for receiving invocation requests from an application running on the mobile device;

while the mobile device is disconnected, intercepting at the device-side object a request from the application for invocation of the particular service and persisting the request using a device-side persistence mechanism, thereby deferring actual invocation of the particular service at that time; and while the mobile device is connected, synchronizing the device-side persistence mechanism with a server-side persistence mechanism residing on a server using a synchronization system that passes the service request on to a service provider for actual invocation, passes back any result from the actual invocation back to the mobile device for use by the application and maintains a consistent state between the mobile device and the server, wherein the device-side object comprises a service computing object that functions as a service provider proxy on the mobile device, and wherein the service computing object operates in conjunction with a service client object which provides the client-side persistence mechanism for handling service invocation requests for the particular service.

2. The method of claim 1, wherein the server-side persistence mechanism comprises a service view provider that communicates directly with the service provider.

3. The method of claim 2, wherein the service view provider runs on an application server.

4. The method of claim 2, wherein the service provider exposes the particular service as a service-oriented architecture (SOA) method that is invoked by the service view provider.

5. The method of claim 1, wherein the server-side persistence mechanism persists any result returned from the actual invocation if the mobile device is disconnected, so that the result is preserved until the mobile device is again connected.

6. The method of claim 1, wherein the application is unaware that the invocation request for the particular service is initially handled locally by the device-side object.

7. The method of claim 1, wherein the device-side object operates in conjunction with metadata describing characteristics necessary for mobilizing the particular service.

8. The method of claim 7, wherein said characteristics include specifying that the particular service is invoked on a deferred basis.

9. The method of claim 7, wherein said characteristics include specifying that the particular service is invoked on a cached basis in which the service is invoked at the mobile device based on data in cache at the mobile device.

10. The method of claim 7, wherein said metadata is accommodated via an extension to WSDL (Web Services Description Language).

11. The method of claim 1, further comprising: storing processor-executable instructions on a computer-readable medium for performing the method of claim 1.

12. The method of claim 1, further comprising: downloading a set of processor-executable instructions for performing the method of claim 1.

13. In an occasionally connected computing environment, a system for providing deferred invocation of services for a mobile device, the system comprising:
 a processor;
 a memory coupled to the processor;
 an application running on a mobile device;
 a device-side object providing mobile support for a particular service from a server, said device-side object intercepting any requests from the application for invocation of the particular service while the mobile device is disconnected and persisting the request using a device-side persistence mechanism, thereby deferring actual invocation of the particular service at that time; and
 a synchronization system which synchronizes the device-side persistence mechanism with a server-side persistence mechanism residing on the server that passes said requests on to a service provider for actual invocation while the mobile device is connected, returns any result from the actual invocation back to the mobile device for use by the application and maintains a consistent state between the mobile device and the server,
 wherein the device-side object comprises a service computing object that functions as a service provider proxy on the mobile device, and
 wherein the service computing object operates in conjunction with a service client object to provide the client-side persistence mechanism for handling service invocation requests for the particular service.

14. The system of claim 13, wherein the server-side persistence mechanism comprises a service view provider that communicates directly with the service provider.

15. The system of claim 14, wherein the service view provider runs on an application server.

16. The system of claim 14, wherein the service provider exposes the particular service as a service-oriented architecture (SOA) system that is invoked by the service view provider.

17. The system of claim 13, wherein the server-side persistence mechanism persists any result returned from the actual invocation if the mobile device is not connected, so that the result is preserved until the mobile device is again connected.

18. The system of claim 13, wherein the application is unaware that the invocation request for the particular service is initially handled locally by the device-side object.

19. The system of claim 13, wherein the device-side object operates in conjunction with metadata describing characteristics necessary for mobilizing the particular service.

20. The system of claim 19, wherein said characteristics include specifying that the particular service is invoked on a deferred basis.

21. The system of claim 19, wherein said characteristics include specifying that the particular service is invoked on a cached basis in which the service is invoked at the mobile device based on data in cache at the mobile device.

22. The system of claim 19, wherein said metadata is accommodated via an extension to WSDL (Web Services Description Language).

* * * * *